(12) United States Patent
Kikuchi

(10) Patent No.: US 9,223,524 B2
(45) Date of Patent: Dec. 29, 2015

(54) INFORMATION PROCESSING APPARATUS, INFORMATION PROCESSING METHOD, AND RECORDING MEDIUM

(75) Inventor: Hiroshi Kikuchi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 205 days.

(21) Appl. No.: 13/602,595

(22) Filed: Sep. 4, 2012

(65) Prior Publication Data

US 2013/0063742 A1    Mar. 14, 2013

(30) Foreign Application Priority Data

Sep. 8, 2011   (JP) .................................. 2011-196143

(51) Int. Cl.
*G06K 15/02* (2006.01)
*G06F 3/12* (2006.01)
*G06F 15/00* (2006.01)

(52) U.S. Cl.
CPC ............ *G06F 3/1205* (2013.01); *G06F 3/1228* (2013.01); *G06F 3/1253* (2013.01); *G06F 3/1285* (2013.01)

(58) Field of Classification Search
CPC ... G06F 3/1204; G06F 3/1205; G06F 3/1206; G06F 3/1208; G06F 3/1224; G06F 3/1232; G06F 3/1244; G06F 3/1245; G06F 3/1248; G06F 3/1285; G06F 3/1286

USPC ............ 358/1.1, 1.4, 1.5, 1.6, 1.9, 1.11, 1.12, 358/1.13, 1.14, 1.15, 1.16, 1.17, 1.18; 35/1.1, 1.4, 1.5, 1.6, 1.9, 1.11, 1.12, 35/1.13, 1.14, 1.15, 1.16, 1.17, 1.18
See application file for complete search history.

(56) References Cited

U.S. PATENT DOCUMENTS

| 2006/0224780 | A1* | 10/2006 | Saito | 710/8 |
| 2008/0079973 | A1* | 4/2008 | Beus et al. | 358/1.13 |
| 2009/0279125 | A1* | 11/2009 | Liu et al. | 358/1.15 |
| 2011/0063660 | A1* | 3/2011 | Yamada | 358/1.15 |
| 2013/0016372 | A1* | 1/2013 | Shibano | 358/1.9 |

FOREIGN PATENT DOCUMENTS

| JP | 2006-080944 A | 3/2006 |
| JP | 2007-172201 A | 7/2007 |
| JP | 2008-078801 A | 4/2008 |
| JP | 2011-003195 A | 1/2011 |

* cited by examiner

*Primary Examiner* — Thierry L Pham
(74) *Attorney, Agent, or Firm* — Canon USA, Inc. IP Division

(57) ABSTRACT

An information processing apparatus includes an extraction unit configured to extract a character from an input character string and a generation unit configured to generate a print-Ticket with the character extracted by the extraction unit as an Option of a plurality of Features, wherein print data is generated from the printTicket generated by the generation unit and a rendering command from an application.

15 Claims, 21 Drawing Sheets

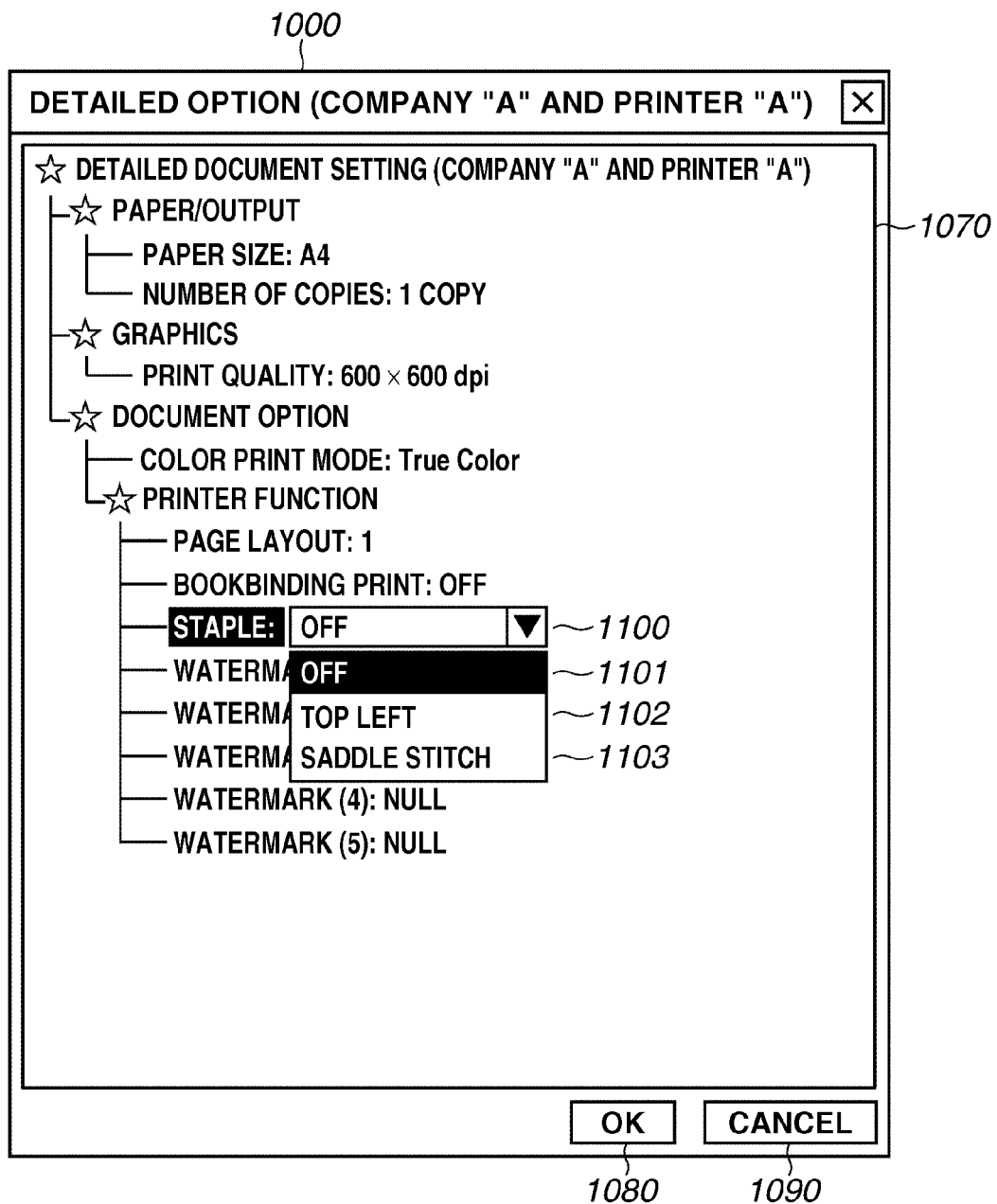

FIG.6

EXAMPLE OF GPD FILE    2000

```
⁝
*Feature: Stapling                              ~2010
{
   *rcNameID: =STAPLING_STR
   *PrintSchemaKeywordMap: "JobStapleAllDocuments"
   *DefaultOption: OFF
   *ConflictPriority: 34
   *Option: OFF                                 ~2011
   {
      *rcNameID: =OFF_DISPLAY
      *PrintSchemaKeywordMap: "None"
   }
   *Option: TOP_LEFT                            ~2012
   {
      *rcNameID: =CORNER_STR
      *PrintSchemaKeywordMap: "StapleTopLeft"
   }
   *Option: SADDLESTITCH                        ~2013
   {
      *rcNameID: =SADDLESTITCH_STR
      *PrintSchemaKeywordMap: "SaddleStitch"
   }
}
⁝
```

FIG.9

EXAMPLE OF GPD FILE    2100

⁝

\*Feature: WatermarkString01   ~2110
{
 　\*Name: "Watermark(1)"
 　\*DefaultOption: NULL
 　\*ConflictPriority: 101
 　\*Option: NULL           ~2111
 　{
 　　\*Name: "NULL"
 　}
 　\*Option: SPACE          ~2112
 　{
 　　\*Name: "SPACE"
 　}
 　\*Option: Char_0         ~2113
 　{
 　　\*Name: "[0]"
 　}

⁝

\*Option: Char_Z         ~2115
 　{
 　　\*Name: "[Z]"
 　}
}
\*Feature: WatermarkString02   ~2120
{
 　⁝

FIG.10

A PART OF PrintCapabilities    2200

```
   :
   :
<psf:Feature name="ns0000:JobWatermarkString01">                  ~2210
  <psf:Property name="psf:SelectionType">                          ~2211
    <psf:Value xsi:type="xsd:QName">psk:PickOne</psf:Value>
  </psf:Property>
  <psf:Property name="psk:DisplayName">                            ~2212
    <psf:Value xsi:type="xsd:string">WATERMARK (1)</psf:Value>
  </psf:Property>
  <psf:Option name="ns0000:NULL" constrained="psk:None"/>          ~2213
    <psf:Property name="psk:DisplayName">
      <psf:Value xsi:type="xsd:string">NULL</psf:Value>
    </psf:Property>
  </psf:Option>
  <psf:Option name="ns0000:SPACE" constrained="psk:None">          ~2214
    <psf:Property name="psk:DisplayName">
      <psf:Value xsi:type="xsd:string">SPACE</psf:Value>
    </psf:Property>
  </psf:Option>
  <psf:Option name="ns0000:Char_0" constrained="psk:None">         ~2215
    <psf:Property name="psk:DisplayName">
      <psf:Value xsi:type="xsd:string">[0]</psf:Value>
    </psf:Property>
  </psf:Option>

:
     :

<psf:Option name="ns0000:Char_Z" constrained="psk:None">         ~2217
    <psf:Property name="psk:DisplayName">
      <psf:Value xsi:type="xsd:string">[Z]</psf:Value>
    </psf:Property>
  </psf:Option>
</psf:Feature>
<psf:Feature name="ns0000:JobWatermarkString02">                  ~2220
   :
   :
```

FIG.12

A PART OF PrintTicket

2300

```
⋮
<psf:Feature name="ns0000:JobWatermarkString01">      ~2310
  <psf:Option name="ns0000:Char_C"> </psf:Option>    ~2311
</psf:Feature>
<psf:Feature name="ns0000:JobWatermarkString02">      ~2320
  <psf:Option name="ns0000:Char_O"> </psf:Option>    ~2321
</psf:Feature>
<psf:Feature name="ns0000:JobWatermarkString03">      ~2330
  <psf:Option name="ns0000:Char_P"> </psf:Option>    ~2331
</psf:Feature>
<psf:Feature name="ns0000:JobWatermarkString04">      ~2340
  <psf:Option name="ns0000:Char_Y"> </psf:Option>    ~2341
</psf:Feature>
<psf:Feature name="ns0000:JobWatermarkString05">      ~2350
  <psf:Option name="ns0000:NULL"/>                   ~2351
</psf:Feature>
⋮
```

FIG.19

- WATERMARK (1) 1st: [3]
- WATERMARK (1) 2nd: [0]
- WATERMARK (1) 3rd: [d]
- WATERMARK (1) 4th: [e]
- WATERMARK (2) 1st: [3]
- WATERMARK (2) 2nd: [0]
- WATERMARK (2) 3rd: [e]
- WATERMARK (2) 4th: [b]
- WATERMARK (3) 1st: [7]
- WATERMARK (3) 2nd: [9]
- WATERMARK (3) 3rd: [d]
- WATERMARK (3) 4th: [8]
- WATERMARK (4) 1st: [0]
- WATERMARK (4) 2nd: [0]
- WATERMARK (4) 3rd: [0]
- WATERMARK (4) 4th: [0]
- WATERMARK (5) 1st: [0]
- WATERMARK (5) 2nd: [0]
- WATERMARK (5) 3rd: [0]
- WATERMARK (5) 4th: [0]

FIG.20

```
    ⋮
*% === Watermark String 01 options ===============
*%
*OpenUI *Watermark_1/WATERMARK (1): PickOne
*OrderDependency: 50.0 AnySetup *Watermark_1
*DefaultWatermark_1: NULL
*Watermark_1 NULL/NULL: "<</Watermark_1 (NULL) >> setpagedevice"
*Watermark_1 SPACE/SPACE: "<</Watermark_1 (SPACE) >> setpagedevice"
*Watermark_1 Char_0/[0]: "<</Watermark_1 ([0]) >> setpagedevice"
    ⋮
*Watermark_1 Char_Z/[Z]: "<</Watermark_1 ([Z]) >> setpagedevice"
*CloseUI: *Watermark_1

*% === Watermark String 02 options ===============
*%
*OpenUI *Watermark_2/WATERMARK (2): PickOne
    ⋮
```

INFORMATION PROCESSING APPARATUS, INFORMATION PROCESSING METHOD, AND RECORDING MEDIUM

BACKGROUND OF THE INVENTION

1. Field of the Invention

The present invention relates to an information processing apparatus that performs print setting, and to an information processing method and a recording medium.

2. Description of the Related Art

A printer is usually controlled by software called a printer driver operating on a personal computer (PC). The printer driver has two major roles. One role is to allow a user to change printer setting and generally has a user interface (UI). Another role is to convert a rendering command from an application into a page description language (PDL) which can be interpreted by a printer, and transmit data to the printer.

There is such a type of a printer driver as a generic printer description (GPD) based printer driver in printer drivers in Windows (registered trade mark) operating system (OS).

In the GPD based printer driver, a printer driver prepared as a standard in the OS based on a GPD file of a text format created by a printer manufacturer generates a user interface (UI) of the printer driver. From now on, the GPD based printer driver seems to dominate printer drivers in the Windows OS because of its high security.

Japanese Patent Application Laid-Open No. 2007-172201 discusses a technique in which a user can input any character string via the UI of a printer driver.

However, the GPD based printer driver has a problem that the UI for allowing the user to input arbitrary character strings cannot be generated. For example, even though the user desires to input a watermark-print character-string as a watermark into print setting, such a UI cannot be generated. This is due to GPD specifications, and print setting can be specified only from existing choices described in the GPD. A printer driver using postscript printer description (PPD) having a similar format to the GPD has also the similar problem.

SUMMARY OF THE INVENTION

According to an aspect of the present invention, an information processing apparatus includes an extraction unit configured to extract a character from an input character string and a generation unit configured to generate a printTicket with the character extracted by the extraction unit as the Option of a plurality of Features, wherein the print data is generated from the printTicket generated by the generation unit and based on a rendering command from an application.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 5 illustrates an example of a UI of the GPD based printer driver.

FIG. 6 illustrates an example of a GPD file.

FIG. 9 illustrates a part of the GPD file according to the first exemplary embodiment.

FIG. 10 illustrates a part of PrintCapabilities according to the first exemplary embodiment.

FIG. 12 illustrates a part of PrintTicket according to the first exemplary embodiment.

FIG. 19 illustrates a part of the UI of the GPD based printer driver according to the second exemplary embodiment.

FIG. 20 illustrates a part of a PPD file.

DESCRIPTION OF THE EMBODIMENTS

Various exemplary embodiments, features, and aspects of the invention will be described in detail below with reference to the drawings.

Figure 1:
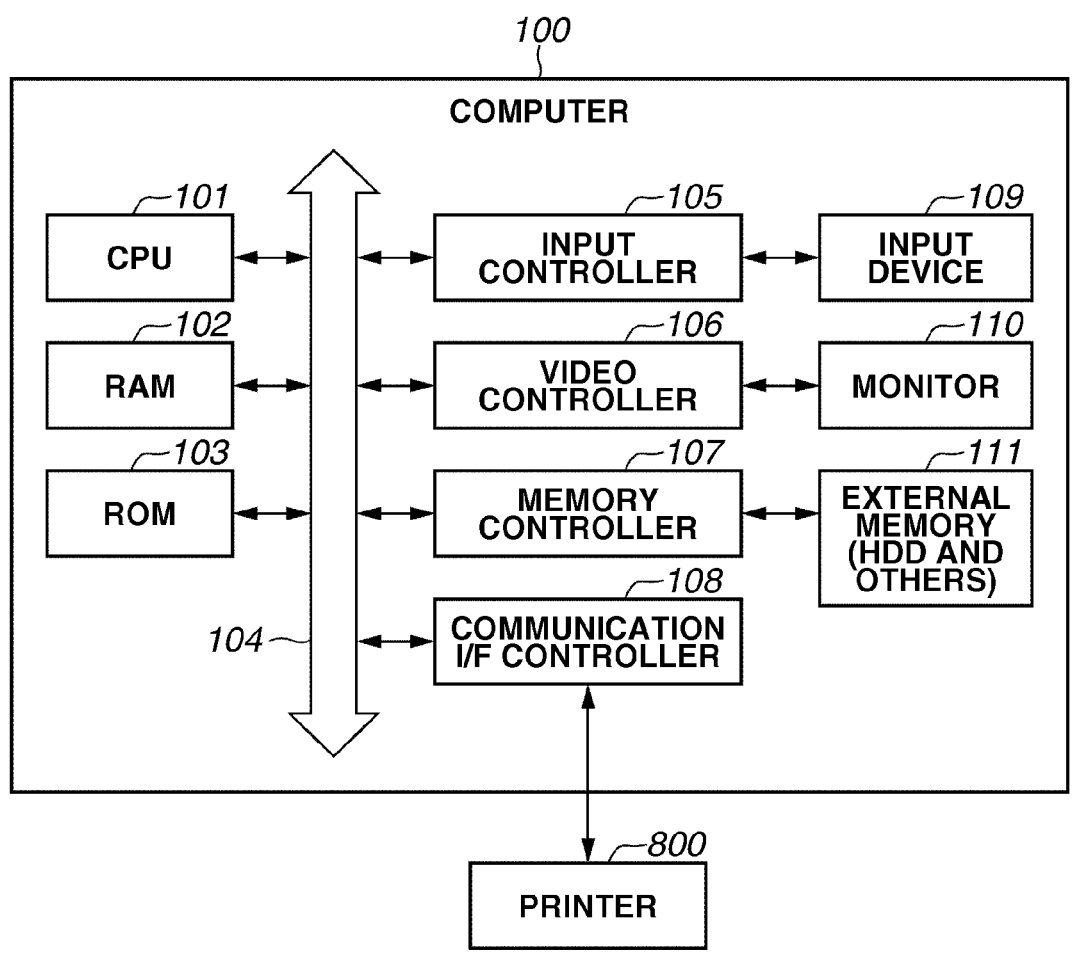
FIG. 1 is a block diagram illustrating a hardware configuration according to an exemplary embodiment of the present invention.

FIG. 1 is a block diagram illustrating a hardware configuration of a print system according to the present exemplary embodiment. A computer (an information processing apparatus) 100 is connected with a printer 800 via a network and a universal serial bus (USB). A central processing unit (CPU) 101 collectively controls devices and controllers connected with a system bus 104. A random access memory (RAM) 102 functions as a main memory and a work memory of the CPU 101. A read only memory (ROM) 103 stores a basic input/output system (BIOS) of the computer 100.

An input controller 105 controls an input device 109 such as a mouse and a keyboard. A video controller 106 controls display on a monitor 110. A memory controller 107 controls reading data from and writing data to an external memory 111 such as a hard disk drive (HDD). A communication interface (I/F) controller 108 controls a communication interface with an external apparatus.

Various programs for realizing the present invention are stored in an external memory 111, loaded to the RAM 102 if needed, and executed by the CPU 101.

Figure 2:
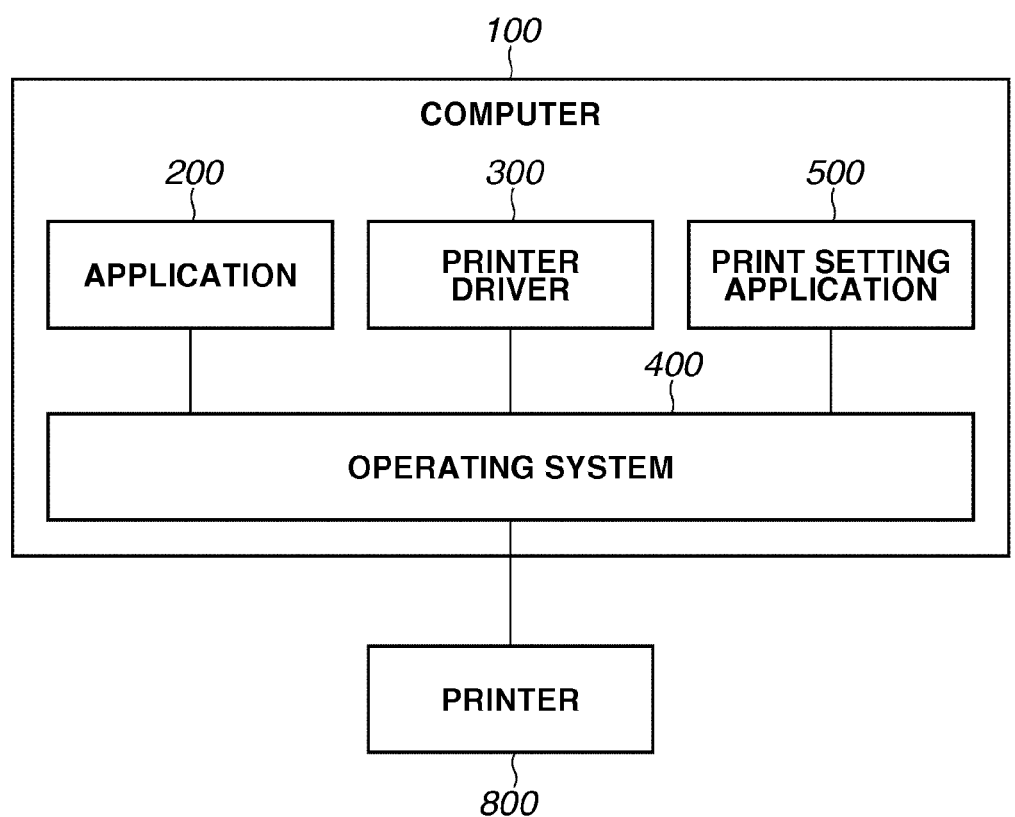
FIG. 2 is a block diagram illustrating a software configuration according to an exemplary embodiment.

FIG. 2 is a block diagram illustrating a software configuration in the computer 100 according to the present exemplary embodiment. An operating system 400 controls various software and hardware components. The operating system 400 in the present exemplary embodiment is Windows operating system (OS). An application 200 is software used for document creation and spreadsheet operation, for example, and capable of instructing the printer 800 to print using the functions of the operating system 400.

A printer driver 300 is software used for controlling the printer 800, controlled by the operating system 400, loaded, and executed. A print setting application 500 is software in which the present invention is embodied and operates in collaboration with the printer driver 300 and the operating system 400 as one application.

Figure 3:
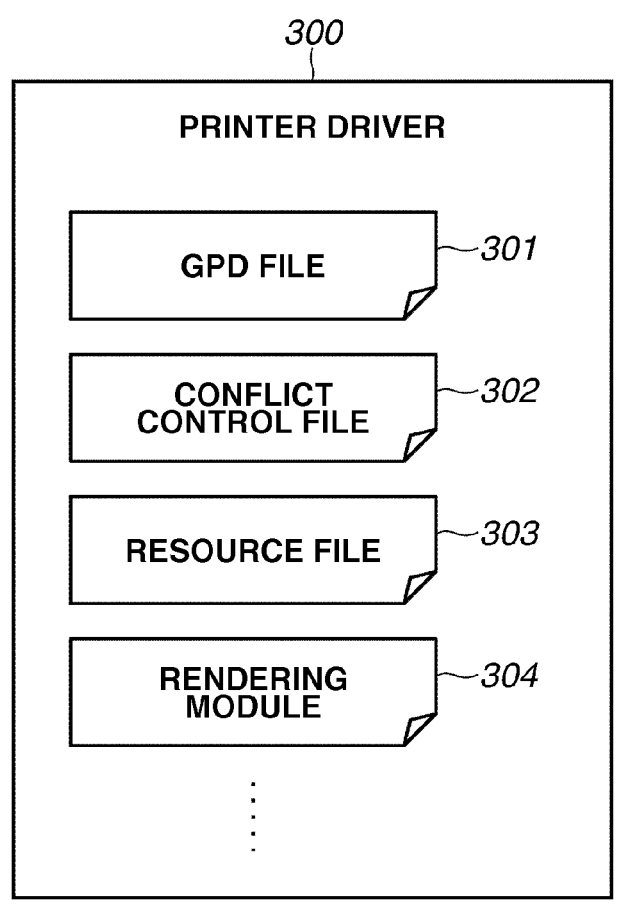
FIG. 3 illustrates configuration files of a printer driver.

FIG. 3 illustrates configuration files of the printer driver 300. The operating system 400 controls, in the external memory 111, a group of files illustrated in FIG. 3 only corresponding to the number of the printer drivers 300 installed in the computer 100. FIG. 3 illustrates configuration files of the printer driver 300 based particularly on the GPD. All the illustrated files are created and distributed by a printer manufacturer.

A print setting for a individual printer is described in a GPD file 301 on a text basis. Prohibition rules in combining the print setting are described in a conflict control file 302 on a text basis. A resource file 303 holds resources such as a character string on the UI of the printer driver 300.

The printer driver 300 prepared as a standard in the operating system 400 generates the UI of the printer driver 300 as required on the basis of the GPD file 301 and the resource file 303, and displays the UI on the monitor 110. The user can edit the print setting on the UI of the printer driver 300 before printing using the input device 109.

A rendering module 304 converts a rendering command into data (PDL) which can be interpreted by the printer at a time of printing from the application 200. The generated PDL is transmitted by the communication I/F controller 108 controlled by the operating system 400 to the printer 800, and printed by the printer 800.

Figure 4:
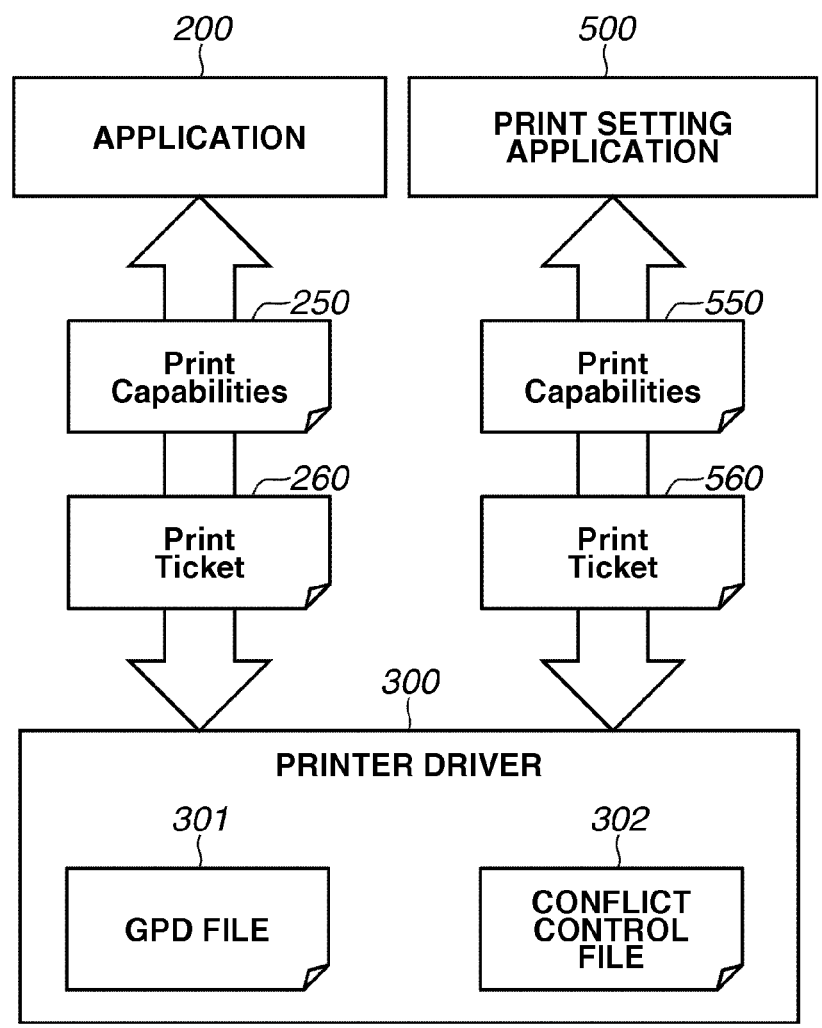
FIG. 4 is a relation diagram of the printer driver, an application, and a print setting application.

FIG. 4 schematically illustrates information which the application 200 or the print setting application 500 exchanges with the GPD based printer driver 300 in order to generate the UI for the print setting.

The printer driver 300 generates the UI required for the print setting using the GPD file 301 and the conflict control file 302. The application 200 exchanges XML data called PrintCapabilities 250 and PrintTicket 260 with the printer driver 300 to generate the UI required for the print setting.

Similarly, the print setting application 500 also exchanges XML data called PrintCapabilities 550 and PrintTicket 560 with the printer driver 300 to generate the UI required for the print setting.

The capability for the print setting of the printer driver 300 is described in the PrintCapabilities 250 and 550. An actual print setting is described in the PrintTicket (260 and 560). Thereby, the application 200 can recognize the capability of the printer driver 300 which the application 200 is about to use and can transfer the required print setting to the printer driver 300. The details of each file are described below.

FIG. 5 is an example of the UI (print setting screen) of the GPD based printer driver 300 (hereinafter referred to as printer driver UI). The printer driver UI 1000 is displayed in an analog format illustrated in FIG. 5 by the printer driver 300 prepared as a standard in the operating system 400. The print setting is displayed in a tree format in an area 1070.

FIG. 5 illustrates the UI in which the user selects the print setting of "staple:" 1100. A comboBox of "staple:" 1100 includes choices of three print settings such as "off" 1101, "top left" 1103, and "saddle stitch" 1103. The user can select any item from among the print settings.

An "OK" button 1080 and a "cancel" button 1090 are prepared on a printer driver UI 1000. When the user presses the "OK" button 1080, the printer driver 300 stores the print settings selected on the UI. When the user presses the "cancel" button 1090, the printer driver 300 discards the print setting illustrated in the UI. The stored print settings are applied by the printer driver 300 at the printing.

FIG. 6 illustrates a part 2000 of the GPD file 301 of the printer driver 300 illustrated in FIG. 5 as an example of the GPD file. Combinations (choices) of the print setting (print function) called Feature and a print setting item (print setting value) called Option are described in the GPD file 301. In FIG. 6, three choices such as "OFF" 2011, "TOP_LEFT" 2012, and "SADDLESTITCH" 2013 are described for "Stapling" 2010 as Feature.

The printer driver 300 prepared as a standard in the operating system 400 generates the printer driver UI 1000 illustrated in FIG. 5 using the GPD file 301 and the resource file 303. The detailed description of the GPD file format is omitted because the format has heretofore been known.

Figure 7:
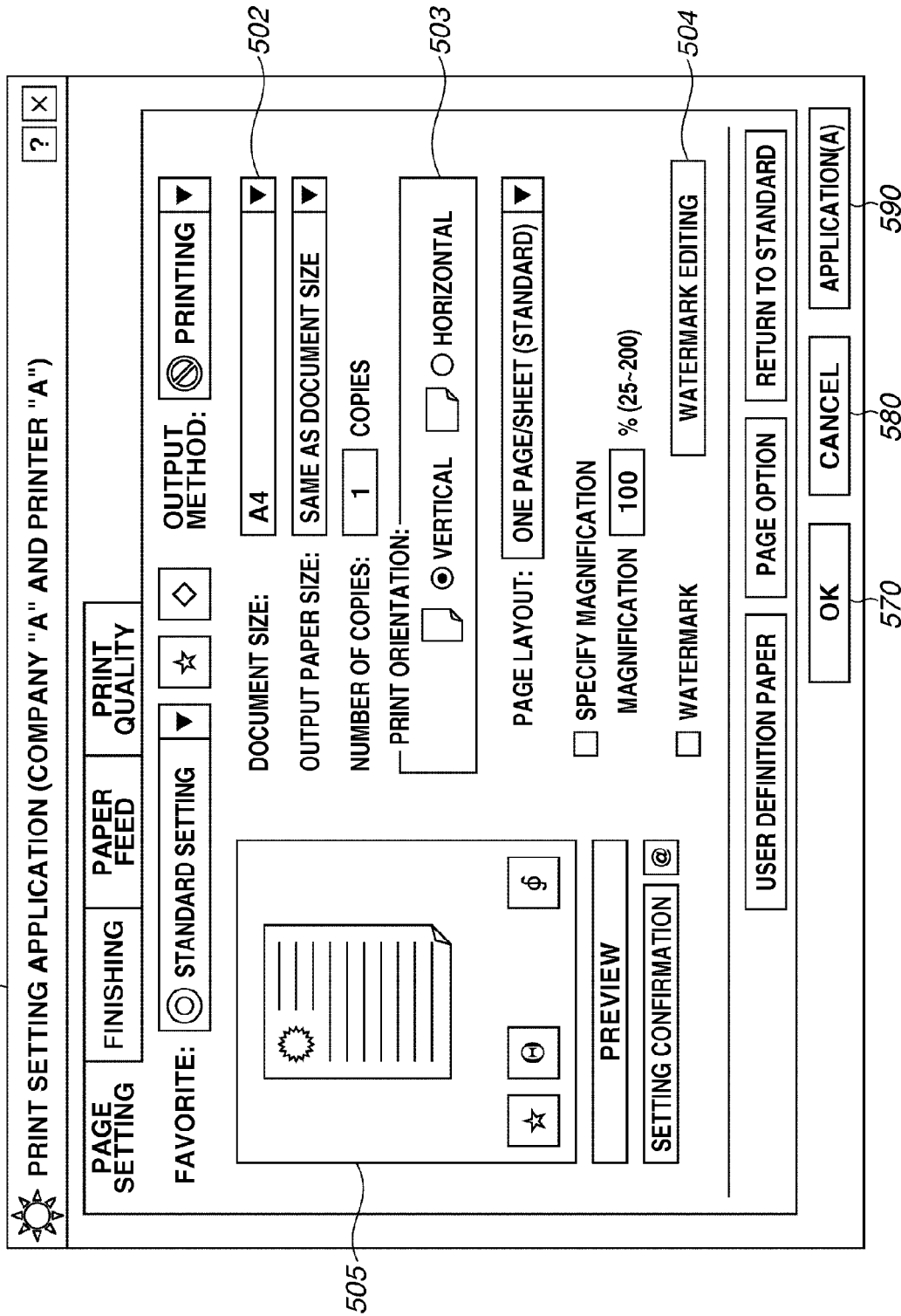
FIG. 7 illustrates an example of a UI of the print setting application.

FIG. 7 illustrates the UI 501 of the print setting application 500. "Document size" 502 in a comboBox form can be selected from a plurality of paper sizes. "Print orientation" 503 can be selected from vertical and horizontal orientations in a radio button form.

The setting of "watermark" can be input by displaying a new dialog by a "watermark editing" button 504. A print result is simply displayed by an icon in a preview area 505 in order to facilitate the user to recognize the state of the current print setting.

The print setting application 500 is prepared because it is difficult for the user to clearly understand a UI only by the GPD based printer driver UI 1000. Like the printer driver configuration file such as the GPD file 301, files are created and distributed by the printer manufacturer.

The UI 501 of the print setting application 500 is provided with an "OK" button 570, a "cancel" button 580, and an "application" button 590. The print setting application 500 stores the print setting indicated by the UI by the user pressing the "OK" button 570 or the "application" button 590, and discards the print setting indicated by the UI by the user pressing the "cancel" button 580. The stored print setting is applied by the printer driver in printing.

Figure 21:
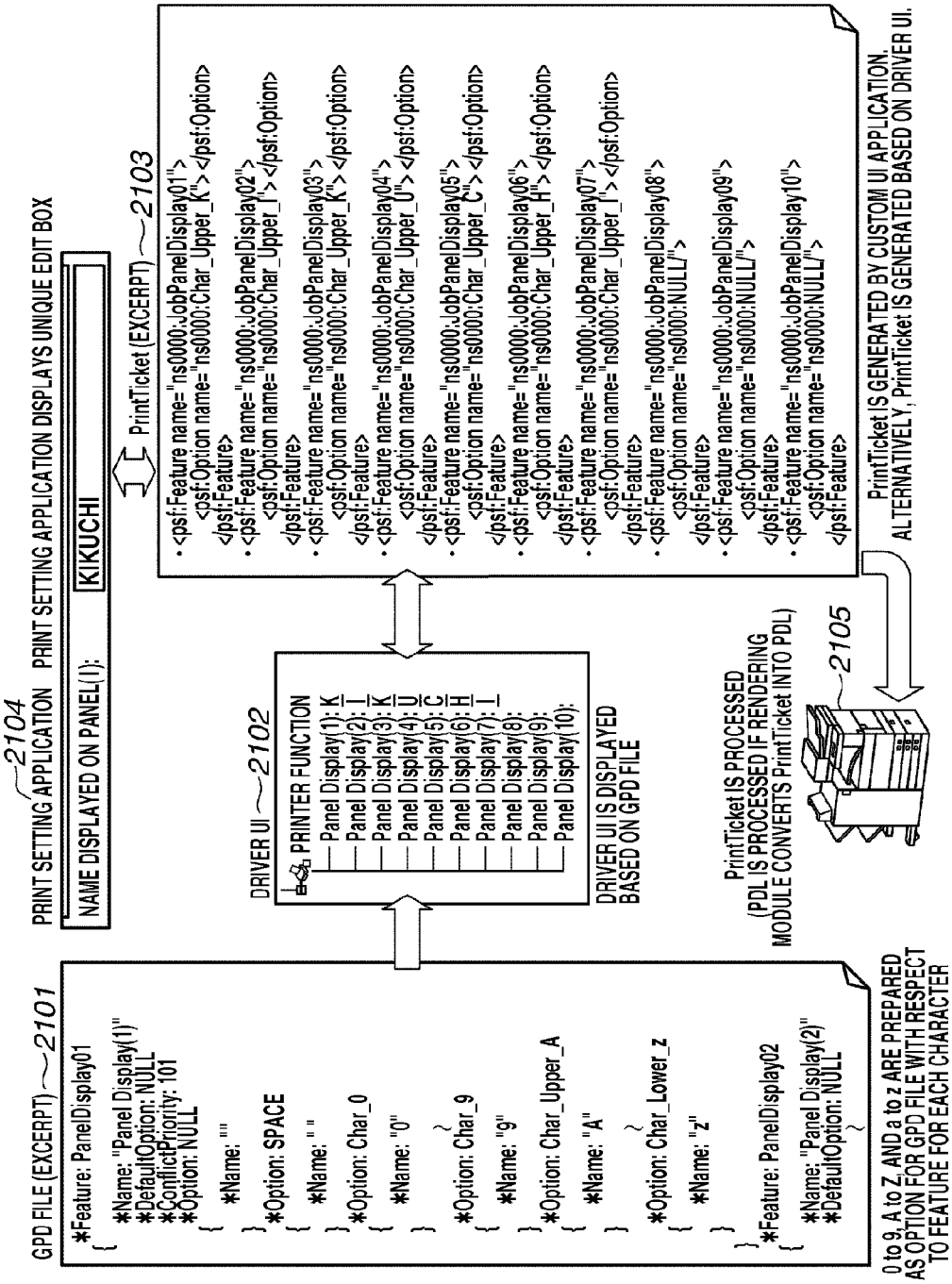
FIG. 21 is a diagram illustrating an outline of the invention.

The present exemplary embodiment is briefly described with reference to FIG. 21. The printer driver 300 is prepared in which "0 to 9, A to Z, and a to z" are described on the GPD file 2101 as choices with respect to Feature (characters displayed on the panel of the printer) for each character.

The printer driver 300 reads the description on the GPD file 2101 and displays the print setting screen of the printer driver 300. The print setting screen includes a selection screen for selecting characters to be displayed on the panel of the printer.

The printer driver 300 selects characters to be displayed on the panel of the printer using the pull-down menu of the selection screen (for selecting one character from 0 to 9, A to Z, and a to z) from the first character. A driver UI 2102 indicates a state where "K," "I," "K," and "U" are selected on the pull-down menu of the first, second, third, and fourth character, respectively.

The printer driver 300 generates a PrintTicket 2103 based on the character string (K, I, K, U, C, H, and I) selected by the pull-down menu. A rendering module 304 generates the PDL to be displayed as "KIKUCHI" on the panel of the printer 2105 in printing document in accordance with the selected character information stored in the PrintTicket 2103 and the rendering command from the application.

In another system, a print setting application 2104 generates the PrintTicket 2103 based on the character input into an edit box of the print setting application 2104 from the keyboard. The rendering module 304 generates the PDL to be displayed as "KIKUCHI" on the panel of the printer 2105 in printing document in accordance with the selected character information stored in the PrintTicket 2103 and the rendering command from the application.

Figure 8:
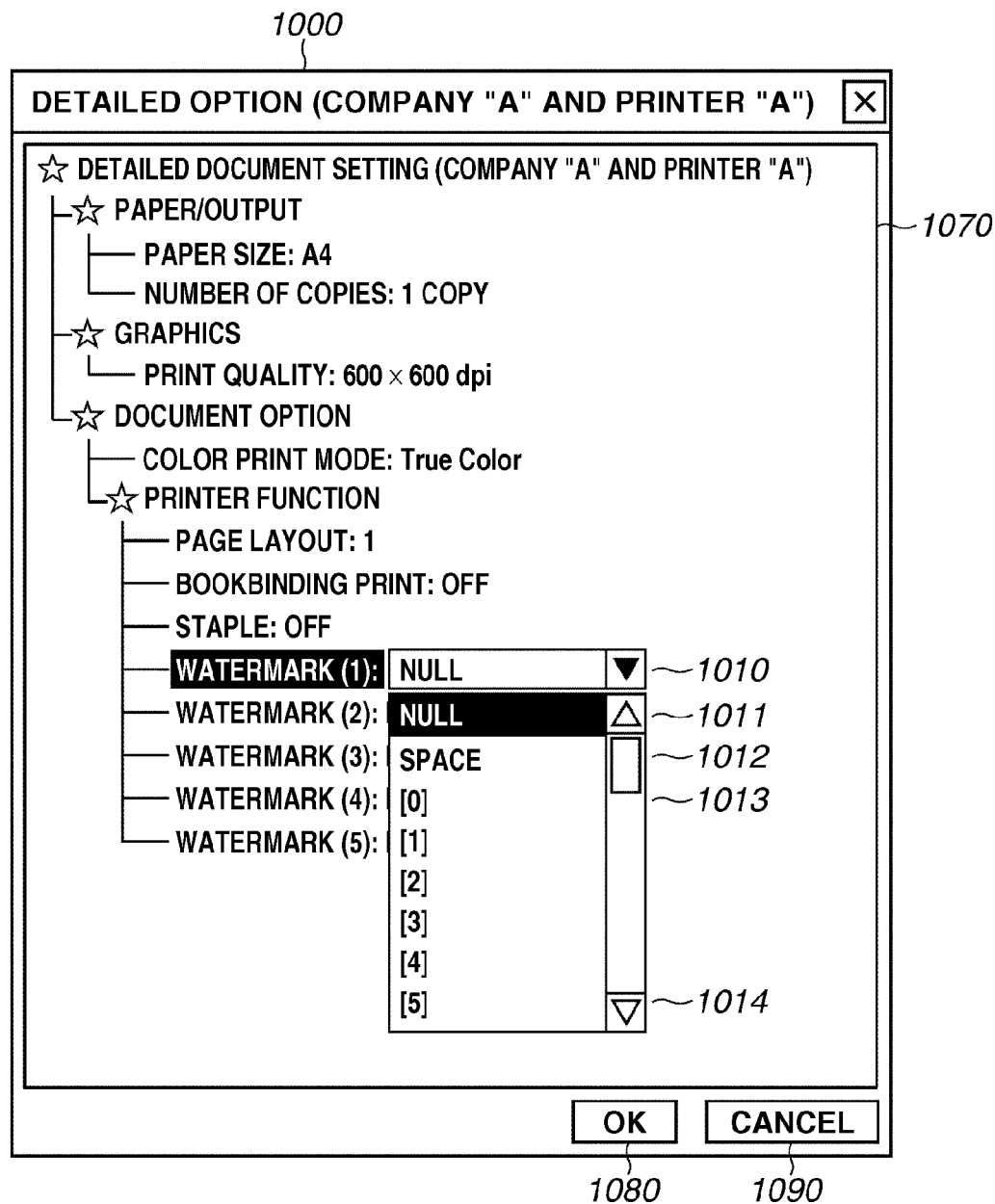
FIG. 8 illustrates an example of a UI of the GPD based printer driver according to a first exemplary embodiment of the present invention.

Each configuration is described in detail below with reference to an example of a watermark function (stamp function). FIG. 8 illustrates the UI (selection screen) in selecting "watermark (1):" 1010 on the UI of the GPD based printer driver 300. As illustrated in FIG. 8, choices for the "watermark (1):" 1010 are "NULL" 1011, "SPACE" 1012, and "(0)" 1013. The first character of the character string, which the user desires to print as a watermark, can be set.

In FIG. 8, though the choices of the "NULL" 1011 to "(5)" 1014 are illustrated, a scroll bar can be actually operated to allow selecting "(0)" to "(9)" and "(A)" to "(Z)". Similarly, in "watermark (2):" to "watermark (5):", the second to fifth character of the character string, which the user desires to print as watermark, can be set. Their respective choices are the same as those for the "watermark (1):" 1010.

FIG. 9 illustrates a part 2100 of the GPD file 301 of the printer driver 300 illustrated in FIG. 8. Herein, "NULL" 2111, "SPACE" 2112, and "Char_0" 2113 to "Char_Z" 2115 are described on "WatermarkString 01" 2110 as Feature.

More specifically, the Feature describes information that a character has a specific function and in what order a character exists in the character string having the specific function. Information about a plurality of characters for selecting a character is described on the Option. The same Option is described also on the second or subsequent characters illustrated in the Feature "WatermarkString 02". The operating system generates the printer driver UI 1000 illustrated in FIG. 8 based on the GPD file 301.

FIG. 10 illustrates a part 2200 of PrintCapabilities 250 and 550 which can be acquired from the GPD based printer driver 300 illustrated in FIG. 8. The capacity of the printer driver which can be input to the first character of the watermark is described on the description of Feature 2210 (Feature name is "ns 0000: JobWatermarkString01."

A Property 2211 indicates that the first character of the watermark has a format to be selected from choices. A Property 2212 describes a name therein displaying the first character of the watermark on the display. In this example, "watermark (1)" is displayed on the display. Options 2213 to 2217 describe choices as their respective print settings and names displayed on the display.

In the choice 2215, for example, while the name of Option is "ns0000:Char_0", the name displayed on the display is "(0)". The second and subsequent characters indicated in Feature 2220 are similar in description.

Figure 11:
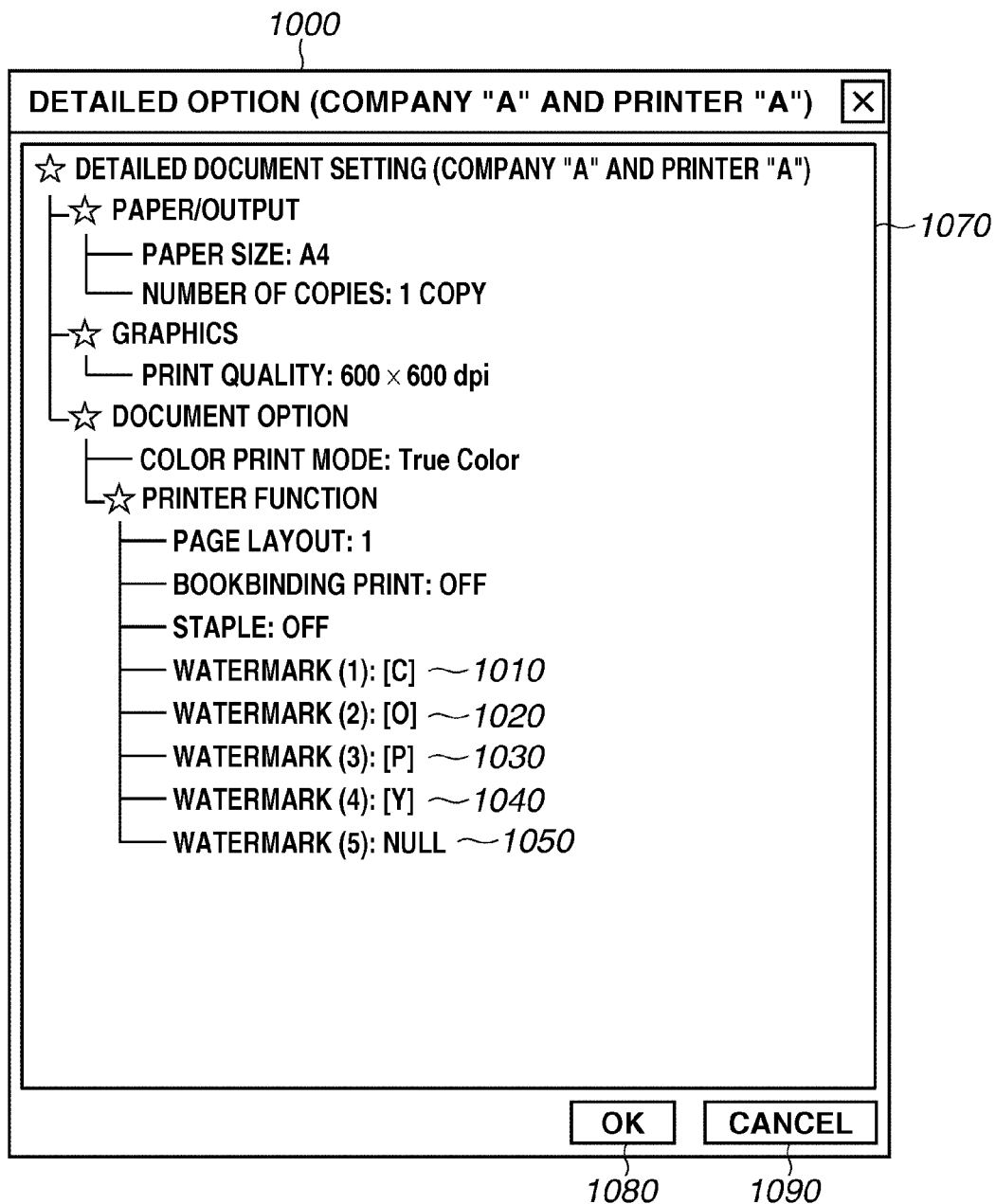
FIG. 11 illustrates an example of a UI of the GPD based printer driver according to the first exemplary embodiment.

FIG. 11 illustrates a state where the user finishes inputting a character string in the GPD based printer driver 300 illustrated in FIG. 8. A character string called "COPY" as a watermark is specified and "C" 1010, "O" 1020, "P" 1030, "Y" 1040, and "NULL" 1050 are specified for each character. Thus, in the UI 1000 of the GPD based printer driver 300, the user has to take the trouble to input a character one by one character to input any character string.

FIG. 12 illustrates a part 2300 of PrintTicket (260 and 560) generated in the UI illustrated in FIG. 11. As illustrated in FIG. 12, Options selected for each Feature is indicated on PrintTicket (260 and 560).

It can be seen that the Option selected on "ns0000: JobWatermarkString01" 2310 which is Feature indicating the first character of the watermark is "ns0000: Char_C" 2311. The Feature of "ns0000: JobWatermarkString02" indicating the second character of the watermark and subsequent Features are also similar in description.

Thus generated PrintTicket (260 and 560) is directly transmitted to the printer 800 along with the PDL in printing and processed by the printer 800 in printing. Alternatively, the PrintTicket (260 and 560) is processed by the rendering module 304 of the printer driver 300 and then transmitted to the printer 800.

If the PrintTicket (260 and 560) is directly transmitted to the printer 800 as in the former case, the printer 800 has to interpret the Feature of the PrintTicket (260 and 560). More specifically, the printer 800 interprets the Features 2310 to 2350 as the first to fifth characters of the watermark respectively.

The printer 800 renders the characters as an actual watermark character-string overlapping on the rendering of the PDL as a watermark character and prints thereof. On the other hand, as in the latter case, if the rendering module 304 of the printer driver 300 processes and then transmits the PrintTicket (260 and 560), the printer 800 does not have to interpret the PrintTicket (260 and 560).

In this case, the rendering module 304 interprets the Feature (2310 to 2350) of the PrintTicket (260 and 560) as a watermark character-string and replaces each character with the character rendering of the PDL. That is, the rendering module 304 generates the PDL in such a manner that the character rendering of the watermark is overlapped on the rendering from the application as a watermark character.

Thus generated PDL is rendered and printed by the printer 800 without distinguishing between a rendering from the application and a rendering of watermark.

In either case, if NULL (2351, for example) is designated as Option of Feature in the PrintTicket (260 and 560), NULL is interpreted as the end of the watermark character string.

The operation of the print setting application 500, which is the exemplary embodiment of the present invention, is described in detail below.

Figure 13:
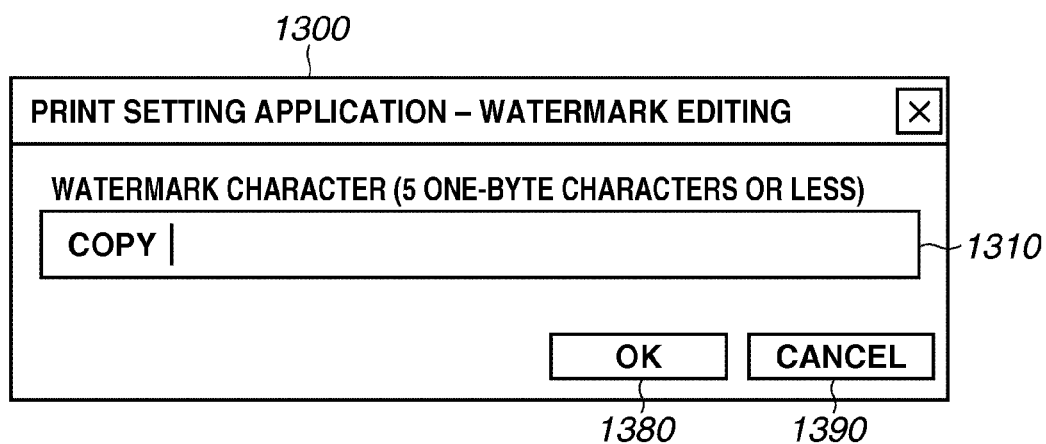
FIG. 13 illustrates a part of a UI of a print setting application according to the first exemplary embodiment.

FIG. 13 illustrates a dialog box 1300 of the print setting application opened by the user pressing the "watermark editing" button 504 in the UI 501 of the print setting application 500 illustrated in FIG. 7.

Data can be input in the dialog box 1300 in an edit box form 1310 which allows the watermark character string to be simply input from the keyboard. In the present exemplary embodiment, the watermark character string uses five one-byte characters at maximum, so that the content is displayed in the dialog to attract the user's attention.

The user focuses on the edit box 1310 using the input device 109 and inputs any character string into the edit box 1310. The dialog box 1300 is provided with an "OK" button 1380 and a "cancel" button 1390.

When the user presses the "OK" button 1380, the print setting application 500 reflects the character string input into the edit box 1310 in the PrintTicket. On the other hand, when the user presses the "cancel" button 1390, the print setting application 500 discards any character string input into the edit box 1310.

Figure 14:
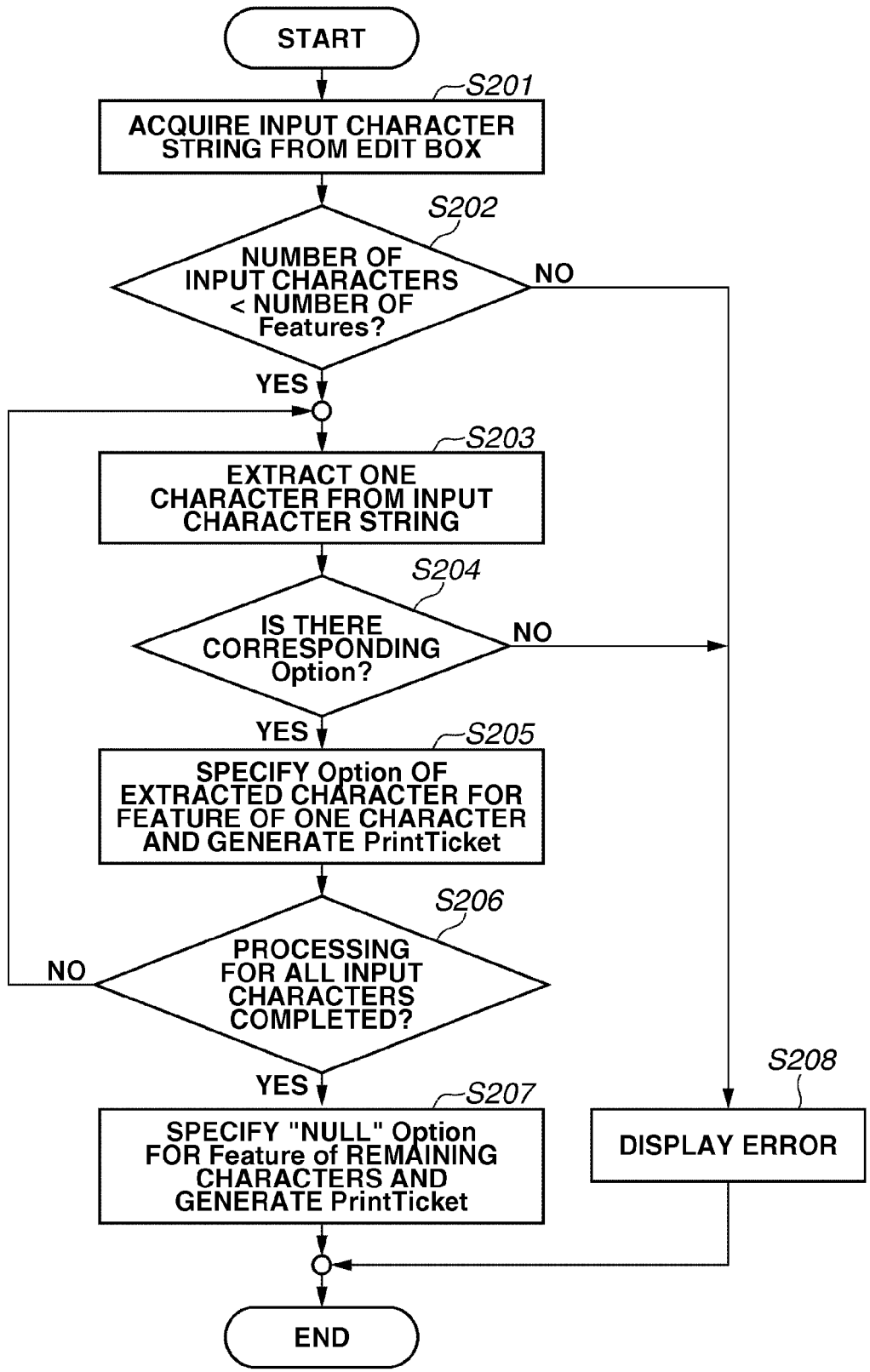
FIG. 14 is a flow chart illustrating processing in which the print setting application generates the PrintTicket 560.

FIG. 14 is a flow chart illustrating processing in which the print setting application 500 reflects the character string of the edit box 1310 in the PrintTicket 560, as described above.

In step S201, the print setting application 500 acquires an input character string from the edit box 1310. In step S202, the print setting application 500 compares the number of characters of the acquired input character string with the number of Features in the corresponding setting item.

The number of Features in the present exemplary embodiment indicates that of Features for the watermark character string written in the PrintCapabilities 550. More specifically, five Features of "ns0000: JobWatermarkString01" 2210 to "ns0000: JobWatermarkString05" (not illustrated) are the corresponding number of Features.

If the number of characters of the input character string is greater than the number of Features (NO in step S202), in step S208, the print setting application 500 displays an error and does not generate the PrintTicket. If the number of characters of the input character string is smaller than the number of Features (YES in step S202), in step S203, the print setting application 500 extracts one character from the input character string.

In step S204, the print setting application 500 confirms if the Option corresponding to the extracted character exists in the PrintCapabilities 550. Specifically, the first character is "C", so that the print setting application 500 confirms if "ns0000: Char_C" which is the corresponding Option exists in the PrintCapabilities 550. The Option corresponding to the input character is written in a correspondence table (not illustrated) separately stored in the print setting application.

Figure 16:
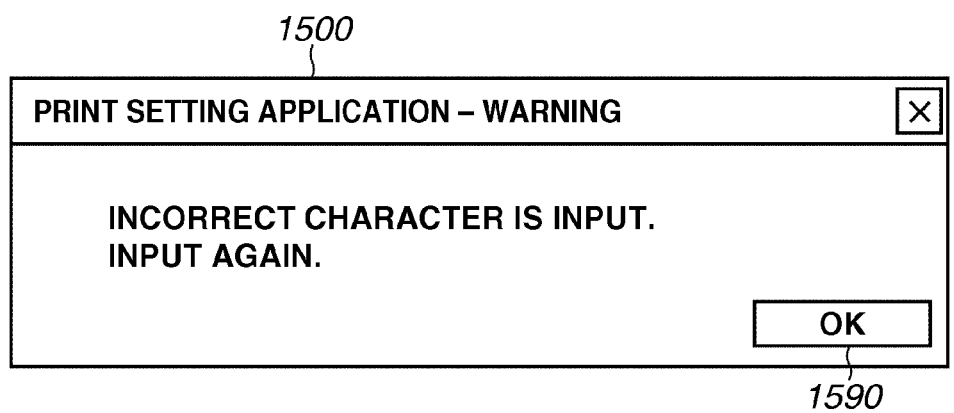
FIG. 16 is an error display UI displayed by the print setting application.

If the corresponding Option does not exist in the PrintCapabilities 550 (NO in step S204), the print setting application 500 displays an error and does not generate the PrintTicket. A message box 1500 in FIG. 16 illustrates the UI displayed by the print setting application 500 at that time.

If the corresponding Option exists therein (YES in step S204), in step S205, the print setting application 500 specifies the Option corresponding to the extracted character in the Feature of the following corresponding one character, and generates the PrintTicket 560. More specifically, in step S205 and in the PrintTicket 560 illustrated in FIG. 12, the print setting application 500 generates Feature "ns0000: JobWatermarkString01" 2310 in which "ns0000:Char_C" is described as Option 2311.

In step S206, the print setting application 500 repeats steps S203 to S205 for all input characters. After all the processing is completed, in step S207, the print setting application 500 specifies Option "ns0000: NULL" 2351 in the Feature of remaining characters, and generate PrintTicket 560. The above flow can reflect all the input character strings of the edit box 1310 on the PrintTicket 560.

Thus, the user can specify any character string more easily by using the print setting application 500 according to the present exemplary embodiment than by using the UI 1000 of the GPD based printer driver 300 in which characters must be input one by one.

Figure 15:
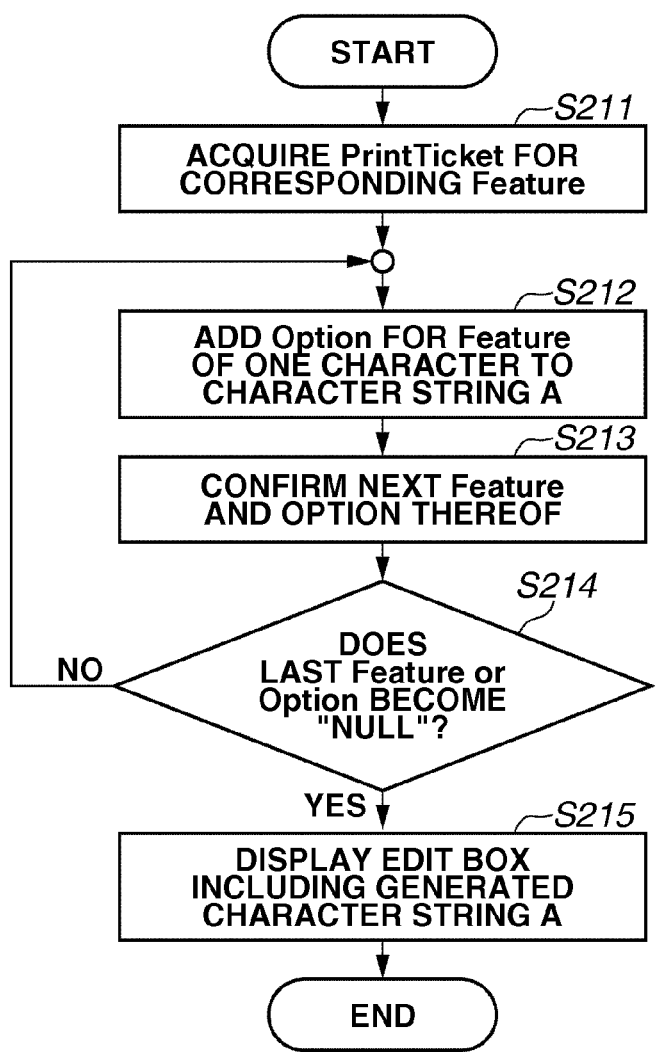
FIG. 15 is a flow chart illustrating processing in which the print setting application displays an edit box.

FIG. 15, different from FIG. 14, illustrates a flow chart in which the print setting application 500 reflects information about the PrintTicket 560 in the edit box 1310 as a character string. In the flow chart, the print setting application 500 displays the UIs 501 and 1300 based on the PrintTicket 560 acquired from the printer driver 300.

The print setting application 500 acquires the Feature corresponding to the print setting to be displayed from the PrintTicket 560. Specifically, in step S211, the print setting application 500 acquires the "ns0000: JobWatermarkString01" 2310.

In step S212, the print setting application 500 adds the character corresponding to the Option of the Feature to the character string A being a buffer. More specifically, the print setting application 500 adds the corresponding character "C" to the character string A based on the "ns0000: Char_C" 2311 illustrated in FIG. 12. The character corresponding to the Option is determined using the abovementioned correspondence table.

In step S213, the print setting application 500 confirms the next Feature and its Option. In step S214, the print setting application 500 repeats steps S212 to S213 until the next Feature indicates the next print setting or the Option becomes "ns0000: NULL."

Thus, characters are input into the character string A by the number of repetitions. In step S215, the generated character string A is input into the edit box 1310 to display. The above-described flow allows reflecting information about the PrintTicket 560 in the edit box 1310.

The message box 1500 in FIG. 16 illustrates a UI displayed by the print setting application 500 when the corresponding Option does not exist in step S204. When the "OK" button 159 is pressed, the print setting application 500 closes the message box 1500 to allow any character string to be input again.

The exemplary embodiment for carrying out the present invention is described above referring to FIGS. 1 to 16. The GPD file, the PrintTicket, and the PrintCapabilities are merely examples for description and their formats may be different. The tree view in the printer GPD based driver UI 1000 and the UI 501 of the print setting application 500 are also merely examples. Even a UI displayed in a different format allows implementation of the present exemplary embodiment without a problem.

In the first exemplary embodiment, one character is allocated to one Feature, but a character having a plurality of bytes such as Japanese cannot be input. This is because the number of Options for the Feature is limited.

Figure 17:
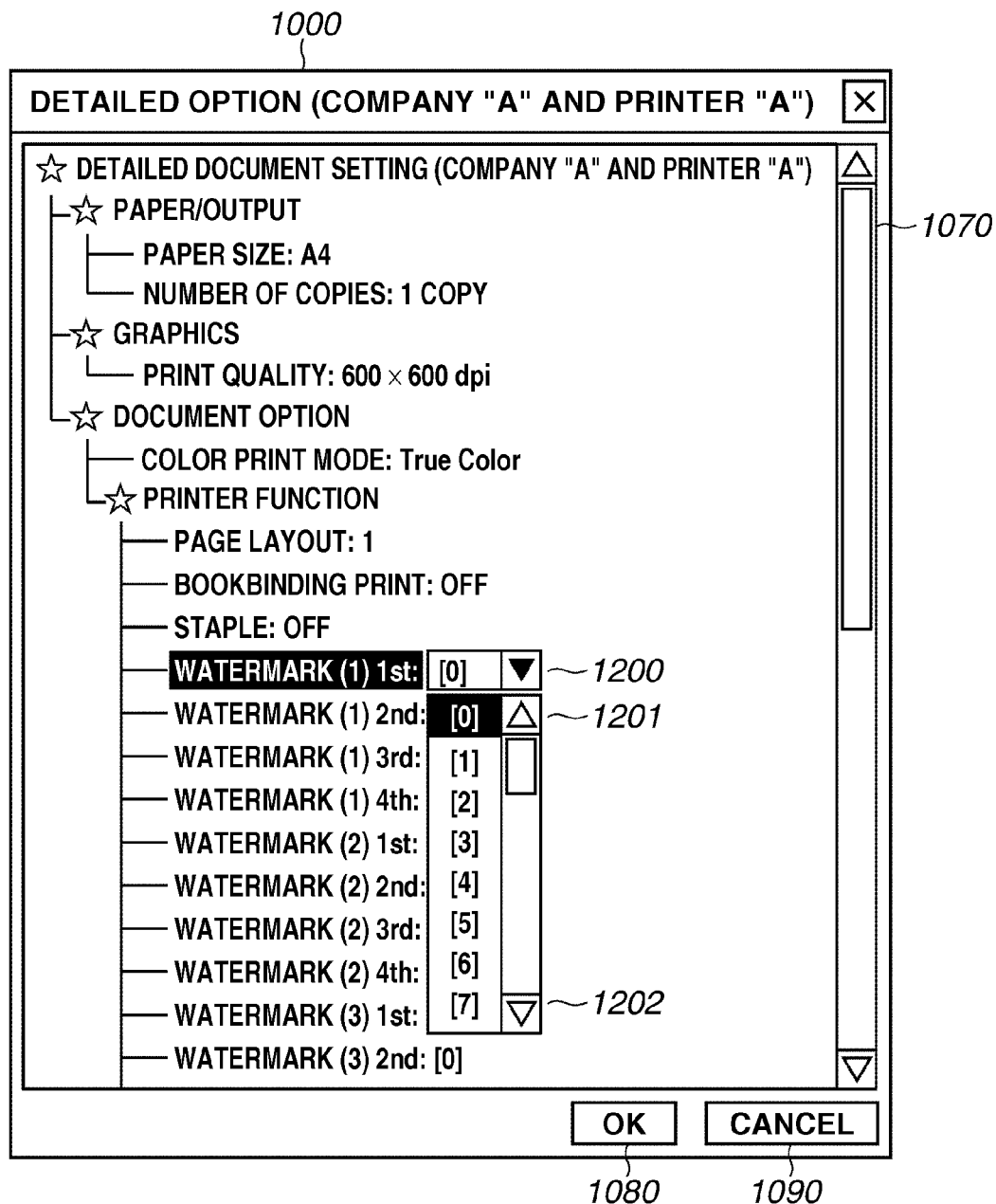
FIG. 17 illustrates an example of a UI of a GPD based printer driver according to a second exemplary embodiment of the present invention.

FIG. 17 illustrated a UI of the printer driver 300 in a case where the numeric value of a character code corresponding to one character is allocated to four Features to solve the above problem. More specifically, FIG. 17 illustrates an example in which one character is represented by 16 bits of UTF-16 and Feature is allocated in units of four bits.

In FIG. 17, four Features of "watermark (1) 1st", "watermark (1) 2nd", "watermark (1) 3rd", and "watermark (1) 4th" represent the first character of the watermark.

Figure 18:
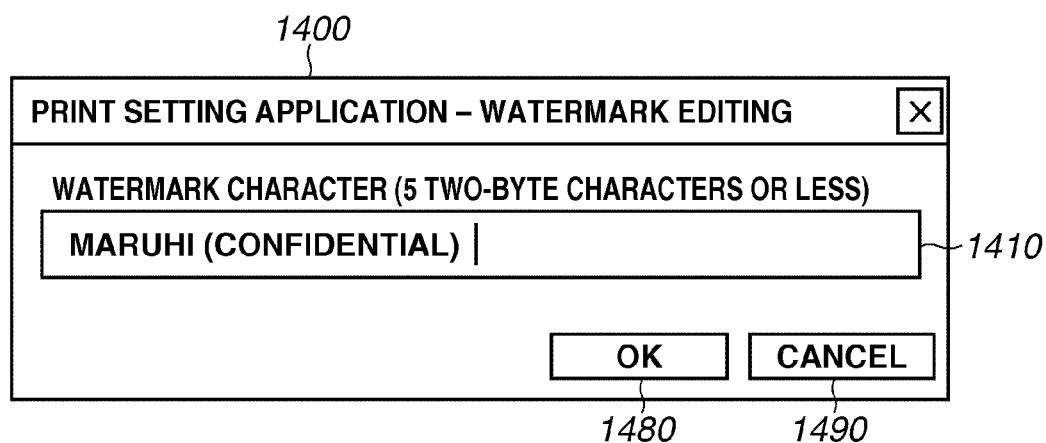
FIG. 18 illustrates a part of a UI of a print setting application according to the second exemplary embodiment.

Options, each of which the user can specify, are an octal numeral from "0" to "f" and four octal numerals indicate a first character. FIGS. 18 and 19 illustrate how to perform allocation.

FIG. 18 illustrates a UI displayed by the print setting application 500 according to the present exemplary embodiment in a case where the printer driver 300 is configured as illustrated in FIG. 17.

More specifically, as is the case with the first exemplary embodiment, FIG. 18 illustrates a dialog box 1400 displayed by the print setting application 500 in pressing the "watermark editing" button 504 in the UI of the print setting application 500 illustrated in FIG. 7. As illustrated in FIG. 18, two-byte characters of Japanese can be input into an edit box 1410. The user can easily input any two-byte character string thereinto.

FIG. 19 illustrates Options for each Feature in reflecting the character string of "confidential" ("Maruhi" in Japanese) in the PrintTicket in the print setting application 500 illustrated in FIG. 18.

If "Ma" of the first character in Japanese is represented by Unicode Transformation Format (UTF)-16, "Ma" is "30de" in hexadecimal. Therefore, "3", "0", "d", and "e" are allocated to "watermark (1) 1st", "watermark (1) 2nd", "watermark (1) 3rd", and "watermark (1) 4th", respectively.

Thus, allocating one character to four Features enables the user to easily input even a character having a plurality of bytes such as Japanese using the print setting application 500. The basic flow which the print setting application 500 performs when one character is represented by a plurality of bytes is similar to that of the first exemplary embodiment, so that the description thereof is omitted herein.

The exemplary embodiments for carrying out the present invention are described above with the GPD based printer driver taken as an example. The present invention, however, is not limited to the GPD based printer driver. The present invention is also applicable to a printer driver using the PostScript Printer Description (PPD) which has similar format to the GPD.

The exemplary embodiments are described above with the watermark, taken as an example, as any character string input by the user, however, the present invention can be also carried out using other than the watermark. For example, the present invention can be adapted to any of various character strings such as: character strings printed as a stamp, user name, password, and header and footer; character strings displayed on the panel of the printer 800; and a storage name when print data is stored in the HDD of the printer 800.

Although the exemplary embodiments of the present invention are described above with the GPD file taken as an example, the present invention is also applicable to a print system using a PostScript Printer. Description (PPD) file illustrated in FIG. 20.

The present invention can provide a printer driver UI to which the user can input any character string even though the GPD based printer drive is used.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-196143 filed Sep. 8, 2011, which is hereby incorporated by reference herein in its entirety.

What is claimed is:

1. An information processing apparatus which utilizes a print setting application, the information apparatus comprising:
   an extraction unit configured to extract a character from an input character string;
   a generation unit configured to generate a print ticket with the extracted character as an option of a plurality of features;
   a printer driver unit configured to generate print data from the generated print ticket and from a rendering command from an application;
   a reading unit configured to read a file including information about a plurality of characters for selecting characters in an area where options for print setting are described,
   wherein a user is allowed to specify a character string using the print setting application instead of using of a user interface from the printer driver.

2. The information processing apparatus according to claim 1, further comprising an error display unit configured to perform an error display if the number of characters input by a print setting application is greater than a number of pieces of information about a specific function described in an area where the print setting is described.

3. The information processing apparatus according to claim 1, wherein the character includes a numeric value indicating a character code.

4. The information processing apparatus according to claim 1, further comprising a display unit configured to display a print setting screen of a printer driver which displays a selection screen for selecting one character from a plurality of characters for each character of a character string for the specific function.

5. A control method utilized in an information processing apparatus which utilizes a print setting application and a printer driver, the method comprising:
   extracting a character from an input character string;
   generating a print ticket with the extracted character as an option of a plurality of features;
   generating print data from the generated print ticket and a rendering command from an application; and
   reading a file including information about a plurality of characters for selecting characters in an area where options for print setting are described,
   wherein a user is allowed to specify a character string using the print setting application instead of using of a user interface from the printer driver.

6. The information processing method according to claim 5, further comprising performing an error display if the number of characters input by a print setting application is greater than the number of pieces of information about a specific function described in an area where the print setting is described.

7. The information processing method according to claim 5, wherein the character includes a numeric value indicating a character code.

8. The information processing method according to claim 5, further comprising displaying a print setting screen of a printer driver which displays a selection screen for selecting one character from a plurality of characters for each character of a character string for the specific function.

9. A non-transitory computer-readable recording medium containing computer-executable instructions for controlling an information processing apparatus which utilizes a print setting application and a printer driver, the medium comprising:
   computer-executable instructions for extracting a character from an input character string;
   computer-executable instructions for generating a print ticket with the extracted character as an option of a plurality of features;
   computer-executable instructions for generating print data from the generated print ticket and a rendering command from an application; and
   computer-executable instructions for reading a file including information about a plurality of characters for selecting characters in an area where options for print setting are described,
   wherein a user is allowed to specify a character string using the print setting application instead of using of a user interface from the printer driver.

10. The computer-readable recording medium according to claim 9, further comprising:
   computer-executable instructions for an error display unit configured to perform an error display if the number of characters input by a print setting application is greater than a number of pieces of information about a specific function described in an area where the print setting is described.

11. The computer-readable recording medium according to claim 9, wherein the character includes a numeric value indicating a character code.

12. The computer-readable recording medium according to claim 9, further comprising:
   computer-executable instructions for a display unit configured to display a print setting screen of a printer driver which displays a selection screen for selecting one character from a plurality of characters for each character of a character string for the specific function.

13. The information processing apparatus according to claim 1, wherein the printer driver is a generic printer description (GPD) based printer driver, the print ticket is a GPD based PrintTicket, and the file is a GDP based file.

14. The information processing method according to claim 5, wherein the printer driver is a generic printer description (GPD) based printer driver, the print ticket is a GPD based PrintTicket, and the file is a GDP based file.

15. The computer-readable recording medium according to claim 9, wherein the printer driver is a generic printer description (GPD) based printer driver, the print ticket is a GPD based PrintTicket, and the file is a GDP based file.

* * * * *